United States Patent [19]
Ramirez et al.

[11] 3,887,491
[45] June 3, 1975

[54] METHOD OF PREPARING SILVER CATALYST

[75] Inventors: Enrique Garcia Ramirez, Bay City; Lowell Curtis Thomas, Lake Jackson; William Earl Fry, Angleton, all of Tex.

[73] Assignee: The Dow Chemical Company, Midland, Mich.

[22] Filed: Nov. 5, 1973

[21] Appl. No.: 413,002

[52] U.S. Cl. .............. 252/430; 252/475; 252/476; 260/348.5
[51] Int. Cl. .............................. B01j 11/20
[58] Field of Search ............... 252/430, 476, 475

[56] References Cited
UNITED STATES PATENTS

| | | | |
|---|---|---|---|
| 2,446,132 | 7/1948 | Evans | 252/430 |
| 2,628,965 | 2/1953 | Sullivan | 252/476 X |
| 2,773,844 | 12/1956 | Carlson et al. | 252/476 X |
| 2,825,701 | 3/1958 | Hermann et al. | 252/476 X |
| 3,332,887 | 7/1967 | Endler | 252/430 X |
| 3,423,328 | 1/1969 | Keith et al. | 252/430 |
| 3,507,809 | 4/1970 | Kollar | 252/430 X |

*Primary Examiner*—Patrick P. Garvin
*Attorney, Agent, or Firm*—A. Cooper Ancona

[57] ABSTRACT

Silver catalysts of uniform fine particle size, having improved activity in the oxidation of ethylene to ethylene oxide, have been prepared by depositing silver or a silver compound on a carrier in the presence of dispersing agents selected from certain natural gums, e.g. karaya or gelatin.

4 Claims, No Drawings

METHOD OF PREPARING SILVER CATALYST

BACKGROUND OF THE INVENTION

This invention relates to a novel silver-containing catalyst and to methods for its preparation.

Silver-containing catalysts, in which the catalytically active component is the metal itself, are well known in the art.

An important use for the catalysts is in the direct oxidative conversion of alkenes to the corresponding vicinal epoxides, and particularly for preparing ethylene oxide from ethylene and a gas containing free oxygen.

Included among the techniques for preparing silver containing catalysts are those in which (1) silver powder is blended with a solid carrier, (2) a paste of silver is coated onto a carrier, (3) silver salts in aqueous solution are used to impregnate a carrier by soaking the carrier therein, (4) reducible silver compounds are coated onto a carrier and (5) silver is deposited directly from a solution of a silver salt containing a reducing agent onto a suitable carrier. In those cases in which silver is deposited as a salt or reducible compound, reduction to silver is accomplished prior to use.

It is believed that the catalytic activity is affected by the amount of silver surface available to the reactants. Thus, it is desirable to have the silver present in a finely divided state to provide as large a surface area per unit volume as possible in the catalyst bed.

DESCRIPTION OF THE INVENTION

It has now been found that by adding certain natural gums to the solution of a silver salt from which the salt is deposited on a catalyst support, that a finely divided crystalline deposit of the salt is obtained on the surfaces of the support which upon reduction to metallic silver provides a highly active silver catalyst. Reduction can be effected in the presence or absence of a reducing gas.

It is believed, but I do not intend to limit myself to any particular theory, that the gums act in the manner of a protective colloid on the small crystals of silver compound which deposit on the support and prevent the growth of large crystals and thus a finely divided uniform crystalline deposit with a high surface area is obtained.

The effect is not only that of keeping the crystals small and uniform, but also of keeping them spaced apart so that effects of sintering during subsequent heating operations are minimized. If the crystals are not spaced apart during the heating step of preparation and in use, they will fuse together, forming larger particles. There will be an accompanying reduction in surface area and the activity of the catalyst will be lessened. The final catalyst has been found to be extremely active, in that a given ethylene conversion can be effected at temperatures up to 30°C. lower than with catalysts known heretofore.

Thus, in the process of making a supported silver catalyst in which a soluble silver compound is impregnated onto a support from an aqueous solution of the silver salt, the salt solution subsequently dried and reduced, thus leaving a silver salt deposit on said support, and wherein said silver salt deposit is subsequently reduced to finely divided silver, the improvement which comprises employing a minor amount of a natural gum, dispersible in said aqueous salt solution, selected from the group consisting of karaya, ghatti, tragacanth, guar, saponin, locust bean, pysyllium seed, quince seed, agar, algin, carrageenin, furcellaran, pectin, gelatin and casein.

The catalyst carriers or supports include, but are not necessarily limited to, fused alumina, zirconia, corundum, mullite, silicon carbide and carbon. Alumina is the preferred carrier, and most preferred is an alumina having a surface area of 1 meter or less per gram, a bulk density of 1.7 to 2.0 grams per cc., a packing density of 58 to 65 lbs. per cubic foot, and having 95 percent of the pore diameter in 4–70 micron range.

The physical shape of the catalyst can be small spheres 2/16 to ½ inch in diameter or small ringlets or any other convenient shaped particulate carrier.

The silver salt can be any soluble silver compound. Representative silver salts which can be used in solution are silver acetate, silver nitrate, silver lactate, silver fluoride and silver chlorate or perchlorate. The preferred salt is silver nitrate, because of its ready availability and relatively easy reduction to metallic silver in the presence of a reducing agent, conveniently hydrogen gas or CO, if such step is desired. The concentrations of the silver salt in solution can be adjusted to provide 2 to 25 percent by weight and preferably 4 to 20 percent by weight, of silver on the carrier. A most preferred range is 10 to 18 percent since this is the range of silver concentration wherein the present process is of greatest advantage.

Natural gums found to be useful in the instant process are karaya, ghatti and tragacanth which are plant exudates; guar, saponin, locust bean, psyllium seed and quince seed which are seed or root extracts; agar, algin, carrageenan and furcellaran which are seaweed extracts and others such as gelatin, casein and pectin. The term "gum" as used in industry and in the present application includes plant mucilages and plant extracts and derivatives which produce viscous dispersions or solutions in water. Certain chemically modified derivatives of starch, of cellulose and of polysaccharides, the unmodified forms of which are insoluble, are also included as substances classifiable as gums and useful in the present process. Also certain combinations of the above materials have been found especially useful and advantageous, e.g. the combination of gelatin and gum arabic.

The solution or dispersion used to treat the catalyst support is usually a water solution of the silver compound containing the gum dispersed therein. Alternatively, the silver compound and some gums which may be less soluble in water can be dispersed in a lower aliphatic alcohol containing from one to four carbon atoms and mixtures thereof with water. Such mixtures are also beneficial if the particular silver salt is not sufficiently soluble in the alcohol alone.

The procedures which can be employed in preparing the catalyst can be varied somewhat. The preferred process is to prepare an aqueous solution of the silver salt, and add the requisite amount of the gum. This mixture is added to the support. After completely wetting the latter, with agitation, the carrier is dried at from about 50°–70°C under vacuum with nitrogen purge and the dried silver salt is reduced either by heat alone, making use of the dispersing agent to reduce the salt, or by heating with hydrogen. If sufficient of the natural gum is present to completely reduce the silver salt, the use of hydrogen or other reducing gas can be eliminated.

An alternative procedure is to prepare the water-silver salt-gum mixture, add the support, in an amount which is not sufficient to absorb all of the liquid, drain excess liquid and dry.

The amount of the gum used in the process, although it will vary with the particular gum, is generally from about 0.5 to about 2.5 percent based on the weight of solution employed and preferably from about 1.0 to about 1.5 percent.

If desired, small amounts, 0.001 to 1.0 percent, based on the weight of silver in the final catalyst, of a promoter can be added. Representative promoters include sodium oxide, calcium oxide, gold chloride, gold oxide, stannous oxide and particularly barium oxide. The promoters can be added as soluble salts which are convertible to oxides on heating in air and can be used individually or in any combination. The dry silver salt on the carrier is reduced to metallic silver with or without hydrogen at a temperature of 125°C. to 400°C. and preferably 200°-300°C.

Reduction of the silver compound can be effected without hydrogen. This step is particularly effective when larger amounts of the gum are used. If desired, reduction can be effected in an atmosphere containing a reducing gas such as hydrogen or carbon monoxide. The amount of reducing gas can be small i.e., about 3-5 percent or it can be essentially 100 percent reducing gas. A preferred reduction is conducted in mineral oil or a high boiling organic ester, e.g. dioctyl sebacate.

The examples which follow are intended to illustrate but not to limit the invention. All parts or percentages are by weight unless otherwise specified.

EXAMPLE 1

To prepare a supported silver catalyst 5000 ml of 3/16" alumina spherical support having the characteristics described above was soaked at 60°C in an excess of an aqueous solution containing 80 percent by weight $AgNO_3$, 0.3 percent by weight $Ba(NO_3)_2$ and 1.65 g. (0.9 percent) saponin per 100 ml of solution. The soaking period was 5 minutes, followed by a draining period of 2 minutes. The wetted support was then dried in an oven at 55°C for 1 hour. Reduction of the silver salt was accomplished by heating at 270°C in a mixture of 10 percent dioctyl sebacate and 90 percent Primol (a high grade mineral oil). Residual oil was burned off in a nitrogen atmosphere at ca. 240°C. The resulting catalyst had a silver burden of 12.03 percent by weight.

EXAMPLE 2

In the manner of Example 1 75 ml. of 3/16" spherical alumina support having the above-described characteristics was soaked at 70°C in an aqueous solution containing 30 percent $AgNo_3$, 0.3 percent $Ba(NO_3)_2$ and 1.0 g (1.5 percent) of powdered agar per 50 ml of solution. Soaking and draining periods were the same as in Example 1. The reduction was carried out in the same way, but at a temperature of 260°C. Residual oil was removed from the catalyst as above. The above process was repeated to obtain a catalyst with a heavier burden of silver. The resulting catalyst contained 22.75 percent by weight silver.

EXAMPLE 3

Sixty milliliters of the support used in Example 1 was soaked with 18 ml of an aqueous solution containing 65 percent $AgNO_3$, 0.18 percent $Ba(NO_3)_2$ and .25 g (0.8 percent) karaya gum. The support completely absorbed the solution and the wetted support was then dried in an oven at 70°C. Reduction was accomplished in dibutyl phthalate at 250°C. The resulting catalyst contained 13.7 percent silver by weight.

EXAMPLE 4

In the manner of Example 2 60 ml of ¼" spherical alumina support was soaked for 5 minutes in 60 ml of an aqueous solution containing 18.7 percent $AgNO_3$, 1.3 percent edible gelatin and 0.1 percent $Ba(NO_3)_2$. The support was then drained 2 minutes, dried for 1 hour at 60°C and reduced at 260°C in the same oil mixture as that of Example 1. Residual oil was removed as previously indicated and the above steps were repeated except that the soaking solution contained 25.6 percent $AgNO_3$, 14.6 percent gelatin and 0.01 percent $Ba(NO_3)_2$. The finished catalyst contained 15.5 percent silver.

EXAMPLE 5

In the manner of Example 4 75 ml of 3/16" spherical alumina support used in Example 1 was soaked in an aqueous solution containing 23.9 percent $AgNO_3$, 0.01 percent $Ba(NO_3)_2$ and 1.3 percent gelatin. Soaking, draining, drying and reducing steps were as in Example 4. The residual oil was removed as previously described and the above steps repeated for additional catalyst burden. The finished catalyst contained 14.6 percent silver.

EXAMPLE 6

A sufficient amount of catalyst for loading a commercial reactor was prepared by soaking 850 lbs. (382.5 kg) of 3/16 " spherical alumina support soaked in 565 lbs (254.3 kg) of an aqueous solution containing 65 percent $AgNO_3$, 0.7 percent $Ba(NO_3)_2$, 0.62 percent gelatin (photographic grade) and 0.31 percent gum arabic. Soaking and draining were done as previously described. The wetted catalyst support was then dried under vacuum with a nitrogen purge at 65°C after which reduction was carried out as in Example 1 at 250°C. The finished catalyst was composed of very finely divided silver (20 percent by wt.) superior both in uniformity and state of subdivision (fineness) to those catalysts in which a gel or a gum alone had been employed. The catalyst was loaded into a commercial reactor for the production of ethylene oxide from ethylene.

The preceding examples have all been directed to the preparation of the catalyst. The following Table presents the reaction conditions and results of using the above catalysts in the oxidation of ethylene to ethylene oxide. The reaction is a well known one and the conditions used are standard, i.e. mole ratios of reactants, temperatures, flow rates, and the like.

TABLE

| Catalyst Ex. No. | Feed Stream (mols/hr.) | | | | Temp. (°C) | $C_2H_4$ Conv. | $C_2H_4O$ Yield | $CO_2$ Yield |
| --- | --- | --- | --- | --- | --- | --- | --- | --- |
| | $C_2H_4$ | $O_2$ | $CO_2$ | $N_2$ | | | | |
| 1 | 0.043 | 0.078 | 0.091 | 0.993 | 247 | 24.7 | 71.6 | 26.0 |
| 2 | 0.051 | 0.074 | 0.090 | 0.990 | 200 | 31.6 | 73.3 | 26.2 |
| 3 | 0.048 | 0.078 | 0.094 | 0.984 | 260 | 33.4 | 71.4 | 25.9 |
| 4 | 0.048 | 0.079 | 0.091 | 0.987 | 266 | 34.4 | 70.0 | 30.0 |
| 5 | 0.048 | 0.079 | 0.091 | 0.987 | 220 | 31.3 | 71.2 | 28.4 |
| *6 | 0.047 | 0.081 | 0.090 | 0.987 | 218 | 32.9 | 72.3 | 25.8 |

*The figures shown for the results are averages for two runs for Ex. 6 catalyst.

The conditions and results for the catalyst of Example 6 employed in a commercial reactor are as follows:

| | | | |
| --- | --- | --- | --- |
| Ethylene fed | = | 4.22 | mols/hr. |
| $CO_2$ fed | = | 6.80 | mols/hr. |
| $O_2$ fed | = | 6.07 | mols/hr. |
| Max. temp. | = | 275°C | |
| Ethylene conv. | = | 29.65% | |
| Ethylene oxide yield | = | 73.3% | |

We claim:

1. In a process for making a supported silver catalyst in which a soluble silver compound is impregnated onto a support from an aqueous solution thereof, subsequently dried and reduced to metallic silver, the improvement of adding to said aqueous solution a natural gum selected from the group consisting of karaya, ghatti, tragacanth, guar, saponin, locust bean, psyllium seed, quince seed, agar, algin, carrageenan, furcellaran, pectin, gelatin and casein in an amount of from about 0.5 to about 2.5 percent based on the total weight of said aqueous solution.

2. The method of claim 1 wherein a water soluble promoter compound of a metal selected from the group consisting of Na, Ca, Au, Sn and Ba, said compound being convertible to the oxide on heating in air, is added to the aqueous impregnating solution in an amount so as to provide from about 0.001 to about 1.0 percent based on the weight of silver.

3. In a process for making a supported silver catalyst wherein a soluble silver compound is impregnated onto a support from an aqueous solution thereof, subsequently dried and reduced to metallic silver the improvement of adding to said aqueous solution a mixture of gum arabic and gelatin in an amount of from about 0.5 to about 2.5 percent based on the total weight of said aqueous solution and wherein the proportion of gelatin to gum arabic is about 2:1.

4. The method of claim 3 wherein a water soluble promoter compound of a metal selected from the group consisting of Na, Ca, Au, Sn and Ba, said compound being convertible to the oxide on heating in air, is added to the aqueous impregnating solution in an amount so as to provide from about 0.001 to about 1.0 percent based on the weight of silver.

* * * * *